(12) United States Patent
Bocksrocker et al.

(10) Patent No.: US 12,533,752 B2
(45) Date of Patent: Jan. 27, 2026

(54) METHOD FOR MONITORING AN ATTACHMENT AREA DURING THE LASER WELDING OF BENT BAR-TYPE CONDUCTORS CONTAINING COPPER

(71) Applicant: TRUMPF Laser- und Systemtechnik GmbH, Ditzingen (DE)

(72) Inventors: Oliver Bocksrocker, Sachsenheim (DE); Nicolai Speker, Pleidelsheim (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 672 days.

(21) Appl. No.: 18/054,550

(22) Filed: Nov. 11, 2022

(65) Prior Publication Data

US 2023/0068733 A1 Mar. 2, 2023

Related U.S. Application Data

(63) Continuation of application No. PCT/EP2021/062708, filed on May 12, 2021.

(30) Foreign Application Priority Data

May 15, 2020 (DE) .................... 10 2020 113 179.8

(51) Int. Cl.
*B23K 31/12* (2006.01)
*B23K 26/22* (2006.01)
*B23K 101/38* (2006.01)

(52) U.S. Cl.
CPC ........... *B23K 31/125* (2013.01); *B23K 26/22* (2013.01); *B23K 2101/38* (2018.08)

(58) Field of Classification Search
CPC .. B23K 31/125; B23K 26/22; B23K 2101/38; G01N 25/72; G01N 33/207
See application file for complete search history.

(56) References Cited

U.S. PATENT DOCUMENTS 7,620,233 B2 11/2009 Beck et al.
11,229,973 B2 1/2022 Haug et al.
(Continued)

FOREIGN PATENT DOCUMENTS

CN 108778606 A 11/2018
DE 10160623 A1 6/2003
(Continued)

*Primary Examiner* — Thien S Tran
(74) *Attorney, Agent, or Firm* — LEYDIG, VOIT & MAYER, LTD.

(57) ABSTRACT

A method for monitoring an attachment area during laser welding of bent bar-type conductors containing copper, includes the steps of arranging a first bar-type conductor relative to a second bar-type conductor in partially overlapping fashion and welding the first and second bar-type conductors to one another using a processing laser beam, the welding including forming a weld bead interconnecting the bar-type conductors to one another. After the welding, at least one measurement variable is measured on at least one portion of the weld bead, wherein the at least one measurement variable changes with the temperature of the weld bead as a function of the time during a cooling down of the weld bead. A parameter depending on a heat capacity of the weld bead is determined from the at least one measured measurement variable, and the attachment area qualitatively or quantitatively determined from the parameter.

20 Claims, 11 Drawing Sheets

(56) References Cited

U.S. PATENT DOCUMENTS

| | | | |
|---|---|---|---|
| 2005/0163364 A1* | 7/2005 | Beck | B23K 26/032 |
| | | | 382/152 |
| 2006/0249487 A1 | 11/2006 | Dunias et al. | |
| 2013/0075371 A1 | 3/2013 | De Souza et al. | |
| 2014/0175071 A1* | 6/2014 | Pfitzner | B23K 26/32 |
| | | | 348/90 |
| 2019/0210158 A1 | 7/2019 | Kamiyama et al. | |
| 2020/0198049 A1* | 6/2020 | Yokoyama | B23K 31/003 |

FOREIGN PATENT DOCUMENTS

| | | |
|---|---|---|
| DE | 102004016669 B3 | 10/2005 |
| DE | 102016211782 A1 | 1/2018 |
| EP | 3088124 A1 | 11/2016 |
| JP | 2002346776 A | 12/2002 |
| JP | 2005230913 A | 9/2005 |
| JP | 2006510490 A | 3/2006 |
| JP | 2014151360 A | 8/2014 |
| JP | 2020082148 A * | 6/2020 |

* cited by examiner

METHOD FOR MONITORING AN ATTACHMENT AREA DURING THE LASER WELDING OF BENT BAR-TYPE CONDUCTORS CONTAINING COPPER

CROSS REFERENCE TO RELATED APPLICATIONS

This application is a continuation of International Application No. PCT/EP2021/062708 (WO 2021/228989 A1), filed on May 12, 2021, and claims benefit to German Patent Application No. DE 10 2020 113 179.8, filed on May 15, 2020. The aforementioned applications are hereby incorporated by reference herein.

FIELD

The invention relates to a method for monitoring an attachment area during the laser welding of bent bar-type conductors containing copper, in particular of hairpins for an electric motor,
 with two bar-type conductors being arranged in partially overlapping fashion and being welded to one another by means of a processing laser beam,
 with a weld bead being formed and leading to the bar-type conductors being connected to one another.

BACKGROUND

Bent bar-type conductors containing copper, in particular what are known as hairpins, are installed in electrodynamic machines, such as electric motors or electric generators. The bar-type conductors are arranged in accordance with an envisaged electrical interconnection and are welded to one another in order thus to construct an electromagnet. In this case, an electrodynamic machine typically comprises several dozen, and often hundreds, of bent bar-type conductors that have to be welded to one another in pairwise fashion.

What is important here is to provide a sufficient cross-sectional area by means of the weld, through which the electric current can flow from one bar-type conductor to the other bar-type conductor ("attachment area"). If the attachment area is too small, there is a risk of significant ohmic heating or a loss of efficiency during the operation, or even of a uselessness of the electrodynamic machine.

The bar-type conductors are often welded by means of a laser beam ("laser welding"). To this end, a laser beam is typically directed at the end surfaces of two overlapping bar-type conductors which usually rest against one another, as a result of which heat is introduced into the bar-type conductors, the latter are melted and, following solidification, interconnected via the re-solidified weld bead. As a rule, the laser beam is directed at the bar-type conductors with a specified power for a specified amount of time, as a result of which a sufficiently large attachment area is generally obtained.

However, the reflectivity of the bar-type conductors for the laser beam, and hence also the actual energy input, may vary on account of contamination or roughness on the surface of the bar-type conductors. Likewise, incorrect positioning of the bar-type conductors, for instance having gaps or an offset, or an inaccurate positioning of the laser beam may lead to a variation in the actual energy input. If the energy input is too low, not enough material is melted and so this leads to the creation of a weld bead that is not large enough and provides an attachment area that is too small. The case of significant spatter formation during the laser welding may also lead to the creation of a weld bead that is too small and has an attachment area which is not big enough.

The size of the obtained attachment area can be determined by means of x-ray analysis. To this end, the bar-type conductor must be brought to a suitable x-ray machine for the creation of an x-ray image post welding, which is complex from an apparatus point of view. The production of a metallographic microsection of the weld bead is also known, but this is quite complicated and destroys the weld.

SUMMARY

In an embodiment, the present disclosure provides a method for monitoring an attachment area during laser welding of bent bar-type conductors containing copper. The method includes the steps of arranging a first bar-type conductor relative to a second bar-type conductor in partially overlapping fashion and welding the first and second bar-type conductors to one another using a processing laser beam, the welding including forming a weld bead interconnecting the bar-type conductors to one another. After the welding, at least one measurement variable is measured on at least one portion of the weld bead, wherein the at least one measurement variable changes with the temperature of the weld bead as a function of the time during a cooling down of the weld bead. A parameter depending on a heat capacity of the weld bead is determined from the at least one measured measurement variable, and the attachment area qualitatively or quantitatively determined from the parameter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1B:
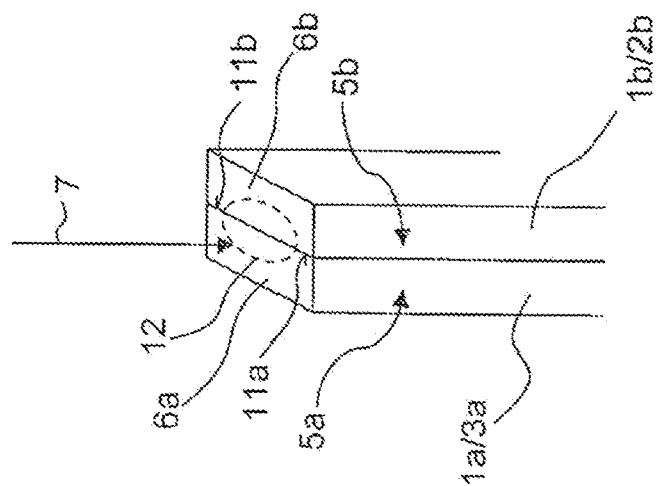
FIG. 1b shows a schematic oblique view of the adjacent end regions of the two bar-type conductors of FIG. 1a, with the view being of the end surfaces.

It is an aspect of the invention to provide a method for monitoring the attachment area during the laser welding of bent bar-type conductors containing copper, said method being able to be carried out easily, quickly and non-destructively.

According to an embodiment of the present invention, at least one measurement variable that changes with the temperature of the weld bead is measured as a function of the time at least on one portion of the weld bead following the end of the exposure to the processing laser beam while the weld bead cools down, a parameter depending on the heat capacity of the weld bead is determined from the at least one measured measurement variable, and the attachment area is determined qualitatively or quantitatively from the parameter.

Within the scope of and embodiment of the method according to the invention, the size or the mass of the weld bead is determined indirectly from the weld bead following the end of the laser welding procedure via the derivation of the heat introduced by the laser welding. In general, the size of the attachment area can then be inferred from the size of the weld bead, and hence it is possible to monitor the attachment area.

Attention is drawn to the fact that, in the experience of the inventors, a direct determination of the size of the weld bead, for instance by analyzing an optical image of the weld bead, is generally not possible with sufficient reliability on account of irregularities of the bar-type conductors, in particular angled surfaces at the bar-type conductor ends.

At the end of the processing laser beam exposure, the weld bead is approximately at the evaporation temperature of the bar-type conductor material; accordingly, an amount of heat approximately proportional to the mass of the weld bead is stored in the said weld bead.

This stored amount of heat is derived via the thermal conduction paths present in the given welding situation, with the thermal conduction paths being specified by the dimensions of the bar-type conductors and the bar-type conductor material, and not depending on the size of the weld bead (during a normal course of welding, i.e., where the weld bead contacts the bar-type conductors over their full cross section). To a good approximation, the derivation of the amount of heat stored in the weld bead is implemented one-dimensionally through the two bar-type conductors. In this case, the heat flow through the bar-type conductors is restricted.

The more amount of heat was originally stored in the weld bead, the slower the weld bead cools down. The cooling behavior is observed by means of the measurement variable. Hence, the amount of heat originally stored, and hence the (absolute) heat capacity, can be inferred by way of the cooling behavior.

The measurement variable which describes a property of at least the portion of the weld bead influenced directly or indirectly (for instance via the phase state) by the temperature is measured as a function of time; as a result, the cooling behavior of the weld bead is observed and the parameter depending on the (absolute) heat capacity of the weld bead can be determined. The parameter depending on the (absolute) heat capacity indicates the mass of the weld bead since the (absolute) heat capacity of the weld bead is proportional to the mass of the weld bead.

The mass of the weld bead in turn determines the geometric size thereof, and hence the attachment area that is provided between the bar-type conductors by the weld bead or the weld, in particular for the conduction of electric current. By way of a calibration for the given welding situation (in particular for the dimensions of the bar-type conductors and the bar-type conductor material), it is possible to then infer the attachment area from the parameter.

To calibrate the monitoring of the attachment area, the measurement variable can be measured and the parameter can be determined therefrom for each of a couple of welds, and the actual attachment area can furthermore be determined conventionally in each case (for instance, by an x-ray examination or a metallographic microsection) ("calibration experiments"). The relationship between the parameter and the actual attachment area (for the given welding situation)

then arises from the calibration experiments. In subsequent welds (with the same welding situation), this relationship can then be used to qualitatively or quantitatively determine the attachment area from the parameter without this being followed by a conventional determination of the actual attachment area.

A typical qualitative determination of the attachment area is restricted to a statement whether the attachment area is sufficiently large (weld "io", in order) or not sufficiently large (weld "nio", not in order). A typical quantitative statement is a direct surface specification for the attachment area (e.g., "5.5 mm$^2$").

Preferred Variants of the Invention
General Variants

A preferred variant of the method according to the invention provides for the two bar-type conductors to be arranged with end regions lying parallel to one another and next to one another,
in particular with the end regions of the bar-type conductors being extensively pressed against one another,
for end surfaces of the bar-type conductors to be located approximately level in relation to the direction of a longitudinal extent of the end regions of the bar-type conductors,
and for the processing laser beam to be directed at the two bar-type conductors in such a way that the weld bead is formed at the end surfaces of the bar-type conductors,
in particular with the end regions of the bar-type conductors being directed approximately vertically upward and the processing laser beam striking the end surfaces approximately perpendicularly. When the weld bead is formed on the end surfaces of the bar-type conductors, the heat dissipation from the weld bead is well defined and the method according to the invention is particularly precise. Typically, the processing laser beam is directed directly at the end surfaces and moves back and forth between the bar-type conductors in the process, for instance on a circular trajectory. When the end regions (legs) of the bar-type conductors are aligned vertically upward, the (initially still liquid) weld bead generated thereon lies particularly stably.

A variant in which at least a portion of the weld bead is observed in the visible spectral range and/or in the infrared spectral range for the purposes of measuring the measurement variable is particularly preferred. A low-cost observation in the visible or infrared spectral range is easily possible, for instance using a camera or a photodiode. Many welding apparatuses already have optical observation systems available, for instance for the relative alignment of laser beam and workpiece(s), and these can also be used by the method according to the invention. Attention is drawn to the fact that the observation is preferably implemented at a frequency of at least 100 Hz.

In a preferred development of this variant, the at least one measurement variable is measured on a portion of the weld bead which is opposite to partial areas of the bar-type conductors on which the processing laser beam acted,
in particular with the at least one measurement variable being measured on a portion of the weld bead located centrally at the top of the weld bead. It is possible to observe the heat dissipation particularly reliably by measuring the measurement variable on this portion; in particular, edge effects as a result of irregularities of the bar-type conductors are minimized. The solidification of the weld bead typically finishes centrally at the top of the weld bead, and so the solidification time can be determined particularly easily here.

Variants Relating to the Measurement Variable

In an advantageous variant, the at least one measurement variable comprises an intensity of a thermionic emission of at least the portion of the weld bead. It is comparatively easy to measure and evaluate the intensity of the thermionic emission.

An advantageous development in this respect provides for the intensity of the thermionic emission to only be measured in a restricted spectral range,
in particular with the restricted spectral range being no greater than 800 nm to 1100 nm,
in particular with, for the purposes of restricting the restricted spectral range, a bandpass filter and/or a broadband filter being arranged in front of a sensor device for measuring the intensity of the thermionic emission,
and in particular with a wavelength range of the processing laser beam being located outside of the restricted spectral range. For bar-type conductors containing copper, the spectral range from 800 nm to 1100 nm is particularly instructive for the determination of the measurement variable depending on the temperature. An overload of the utilized sensor device can be avoided by blocking the wavelength of the processing laser beam. In the case of a wavelength of the processing laser beam of approximately 1030 nm, it is possible for example to restrict the measured spectrum to 800-1000 nm using a bandpass filter or to block the wavelength range around 1030 nm in a targeted fashion using a broadband filter. In particular, it is also possible to select a measured spectral range <1000 nm.

A variant providing for
the weld bead to be illuminated by an observation light beam, more particularly an observation laser beam, while the said weld bead cools down,
and for the at least one measurement variable to comprise an intensity of the observation light beam reflected at the surface of the weld bead is preferred. The reflectivity of the weld bead for the observation light beam changes when the said weld bead cools, particularly in the case of a phase transition (solidification), and this can be exploited by this variant. The observation light beam typically has a narrow bandwidth (e.g., with a full spectral width of 40 nm or less, usually 20 nm or less) and preferably originates from an observation laser, in particular diode laser, or an LED or LED ring. The attachment area can be monitored particularly accurately as a result of using the observation light beam. Attention is drawn to the fact that, in practice, the thermionic emission of the weld bead is superposed on the reflected observation light beam, and the two effects (or the associated intensities) are measured together as a matter of principle, for instance as a mean grayscale value in a partial region of an image from a camera or as a grayscale value from a photodiode.

A development of this variant which provides for
the intensity of the reflected observation light beam to only be measured in a restricted spectral range about a central wavelength of the observation light beam is preferred,
in particular with the restricted spectral range being no greater than +/−20 nm or +/−10 nm about the central wavelength of the observation light beam,
and in particular with, for the purposes of restricting the restricted spectral range, a bandpass filter being arranged in front of a sensor device used to measure the intensity of the reflected observation light beam. What is achieved by the restriction to the restricted spectral range about the central wavelength of the observation light beam is that (additionally present) thermionic emission is superposed on, or falsifies, the measurement of the measurement variable to a lesser extent.

Likewise, a development in which a polarization filter is arranged in front of a sensor device used to measure the intensity of the reflected observation light beam is preferred, in particular with the polarization filter being chosen as a line polarizer. This can improve the contrasts when observing the weld bead by way of the reflected observation light beam.

A development of the variants including an observation of the intensity of the thermionic emission and/or of the reflected observation light beam provides for the weld bead to be observed using a camera and for the intensity of the thermionic emission and/or of the reflected observation light beam at a portion of the weld bead to be determined using the camera by virtue of a mean grayscale value from the camera in a partial region of the image recorded by the camera being determined. This procedure is comparatively simple and has proven its worth in practice; suitable cameras are often available in any case in a welding setup, for instance for the purposes of positioning the laser beam on the workpiece.

In another development of the variants including an observation of the intensity of the thermionic emission and/or of the reflected observation light beam, provision is made for the weld bead to be observed using a photodiode and for the intensity of the thermionic emission and/or of the reflected observation light beam at least at a portion of the weld bead to be determined as the grayscale value from the photodiode. Determining the grayscale value using a photodiode is particularly cost-effective.

Furthermore, a variant in which the measurement variable comprises a temperature at least on a portion of the weld bead is preferred. Measuring the temperature at least on a portion of the weld bead itself may describe the cooling behavior of the weld bead directly, and so the attachment area can be monitored particularly accurately and reliably. However, measuring the temperature is relatively complicated from an apparatus point of view.

A development of this variant in which the temperature is measured by means of quotient pyrometry is preferred, with the intensities of a thermionic emission at least of the portion of the weld bead being measured at two different wavelengths. The measurement by means of quotient pyrometry is particularly reliable. To this end, use can be made of photodiodes with narrow bandwidth bandpass filters that are selective for the two different wavelengths. Alternatively, use can also be made of a thermography camera or a measured spectrum can be fitted to a gray emitter (e.g., copper).

Variants Concerning the Parameter

A variant in which the parameter is a time duration that elapses between a first defined state and a second defined state while the weld bead cools down is particularly preferred. A time duration can be measured relatively easily. Typically, at least one of the defined states is recognized by the time profile of the at least one measurement variable. Typical defined states are the obtainment of certain temperatures or identified phase transitions.

In a preferred development of this variant, the first defined state is the end of the processing laser beam exposure. The time of the end of the processing laser beam exposure ("deactivation") typically is known or specified by way of the controller of the welding process, and therefore need not be ascertained separately.

A development in which the second defined state is the complete solidification of the weld bead is likewise preferred. As a rule, the liquid to solid phase transition can easily be recognized optically, and is therefore well suited to being a second defined state. Both the emission behavior and the reflectivity change quite significantly in the process. Moreover, (complete) solidification can also be recognized optically by virtue of movements on the weld bead having come completely to a standstill.

In an advantageous development, the first and/or the second defined state is recognized by virtue of the measurement variable reaching a threshold value. This procedure is particularly simple. In particular, complete solidification of the weld bead can be recognized by virtue of the intensity of the thermionic emission reaching (or dropping below) a threshold value.

A development is also preferred in which the first and/or the second defined state is recognized by virtue of a first and/or second time derivative of the measurement variable reaching a threshold value,
  in particular by virtue of a first and/or second time derivative of the measurement variable reaching the threshold value after the measurement variable had previously varied only within specified limits over a predetermined minimum duration. Information about the cooling profile, in particular about phase transitions, is often more easily identifiable in the first or the second derivative of the measurement variable than in the measurement variable itself. In particular, solidification of the weld bead leads to an increase in the reflectivity for an observation light beam, which is easily recognizable as a positive gradient in the first derivative of the intensity of the reflected laser radiation.

A variant in which the parameter is a gradient of the measurement variable with respect to time, which is determined at a specified time or averaged over a specified time period, is preferred. By way of example, the gradient can be determined immediately after the end of the processing laser beam exposure, or in averaged fashion over several ten milliseconds after the end of the processing time period. In particular, the measurement variable can be a temperature or an intensity of the thermionic emission. In particular, the gradient of the temperature or the intensity of the thermionic emission can be determined while the weld bead is still fully liquid.

Variants for Evaluating the Parameter

A preferred variant of the method according to the invention provides for
  the parameter or an attachment area determined quantitatively from the parameter to be compared to a decision value,
  for the attachment area of the weld to be recognized as being too small should the decision value not be reached, in particular with bar-type conductors affected in this case being removed or subsequent welding being undertaken,
  and for the attachment area to be recognized as sufficiently large if the decision value is reached and affected bar-type conductors are allowed to be used further. This procedure is particularly simple.

A development of this variant that provides for a proportion of a cross section of the bar-type conductors not covered by the weld bead to be determined by means of a camera and for the attachment area of the weld of the bar-type conductors to be recognized as being too small should the uncovered proportion of the cross section exceed a limit value, even if the decision value is reached, is advantageous. Should the weld bead cover the cross section of the bar-type conductors incompletely, the mutual attachment area of the bar-type conductors is exceptionally not characterized sufficiently by way of the mass or the size of the weld bead. Rather, the assumption can be made that the cross section which restricts the electrical conduction between the bar-type conductors is located in the region of the contact between the weld bead and the bar-type conductor. Should the latter be too small, the weld is just as unusable as in the case of a weld bead that is too small. This development further increases the reliability of recognizing electrically unusable welds.

A variant in which a multiplicity of pairs of bar-type conductors are welded in succession, with one or more welding parameters being optimized and/or updated in a control loop when the pairs of bar-type conductors are welded such that the parameter or an attachment area quantitatively determined from the parameter is set to a specified target value for the pairs of welded bar-type conductors, is also preferred. This procedure allows the quality of the welds produced to be increased, and the number of removal procedures and/or subsequent welding procedures to be minimized.

Apparatus for Laser Welding for the Method According to the Invention

The scope of the present invention also includes an apparatus for the laser welding of bent bar-type conductors containing copper, in particular of hairpins for an electric motor, having a holding device, by means of which two bar-type conductors can be arranged in overlapping fashion, in particular with the holding device comprising a stator mount with a multiplicity of bar-type conductors to be welded, and having a laser processing head which provides a processing laser beam, by means of which the two bar-type conductors are welded to one another such that a weld bead is formed, by means of which the bar-type conductors are interconnected, which apparatus is distinguished in that the apparatus furthermore comprises a sensor device, by means of which at least one measurement variable that changes with the temperature of the weld bead is measurable at least on one portion of the weld bead following the end of the exposure to the processing laser beam while the weld bead cools down, and in that the apparatus furthermore has an electronic evaluation device which is configured, more particularly programmed, to determine a parameter depending on the heat capacity of the weld bead from the at least one measured measurement variable, and in that the electronic evaluation device furthermore is formed, more particularly programmed, to qualitatively or quantitatively determine an attachment area set up by the weld bead from the parameter. The apparatus according to the invention is configured in particular to carry out an above-described method according to the invention, or can be used to carry out an above-described method according to the invention. Use of the apparatus allows the attachment area to be easily, quickly and non-destructively monitored during the laser welding of bent bar-type conductors containing copper, in particular also online during the manufacture of the welds.

Further advantages of the invention will become apparent from the description and the drawing. Likewise, according to the invention, the features mentioned above and those that will be explained still further may be used in each case individually by themselves or as a plurality in any desired combinations. The embodiments shown and described should not be understood as an exhaustive enumeration, but rather are of illustrative character for outlining the invention.

Figure 1A:
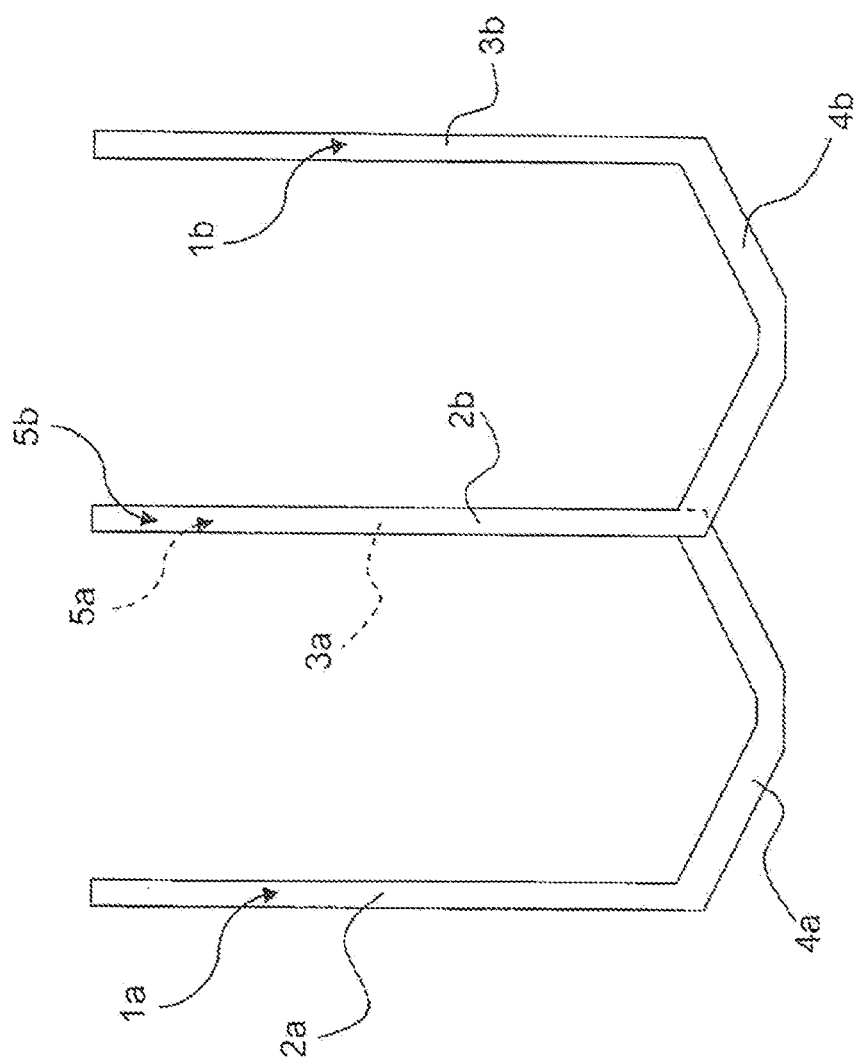
FIG. 1a shows a schematic side view of two bent bar-type conductors in a partially overlapping arrangement, which should be welded to one another within the scope of the invention.

In a schematic side view, FIG. 1a shows two bent bar-type conductors $1a$, $1b$ containing copper, which are in the form of what are known as hairpins, for the manufacture of an electrodynamic machine, for instance an electric motor. Each bar-type conductor $1a$, $1b$ approximately has a U-shape and comprises two legs (limbs) $2a$, $3a$ and $2b$, $3b$ and a central part $4a$, $4b$ connecting the legs.

The intention is to electrically conductively interconnect the bar-type conductors $1a$, $1b$, and to this end these should be welded to one another at their end regions $5a$, $5b$. For this purpose, the leg $3a$ of the first bar-type conductor $1a$ and the leg $2b$ of the second bar-type conductor $1b$ are arranged in overlapping fashion and also adjacently in this case.

As is evident from the schematic oblique view of the end regions $5a$, $5b$ in FIG. 1b, the end surfaces $6a$, $6b$ of the two bar-type conductors $1a$, $1b$ have been arranged approximately level, and the long sides $11a$, $11b$ of the end regions $5a$, $5b$ of the legs $3a$, $2b$ abut extensively and flush against one another, with the legs $3a$, $2b$ being pressed against one another in a manner not depicted in any more detail. The legs $3a$, $2b$ are aligned parallel to one another and vertically such that the two end surfaces $6a$, $6b$ are aligned upwardly.

A processing laser beam 7 is used to weld the two end regions $5a$, $5b$, the laser beam in this case sweeping over the end surfaces $6a$, $6b$ in a repeating circular trajectory 12. In this case, the processing laser beam 7 strikes the end surfaces $6a$, $6b$ approximately perpendicularly; attention is drawn here to the fact that the angle of incidence of the processing laser beam 7 typically varies slightly during the manufacture of various pairs of bar-type conductors in order not to have to displace the bar-type conductors $1a$, $1b$, which are usually arranged in a stator mount (not depicted in any more detail here; but, cf., e.g., FIG. 4), too frequently. In this case, the processing laser beam 7 typically does not deviate by more than 40° from perpendicular incidence.

As a result of the processing laser beam 7 exposure, the material of the bar-type conductors $1a$, $1b$ fuses near the end surfaces $6a$, $6b$, and what is known as a weld bead forms. Attention is drawn to the fact that, as a rule, a specified laser power is used in this case for a predetermined period of time for a multiplicity of pairs of bar-type conductors to be welded, the attachment area of which is intended to be monitored within the scope of the invention.

Figure 2:
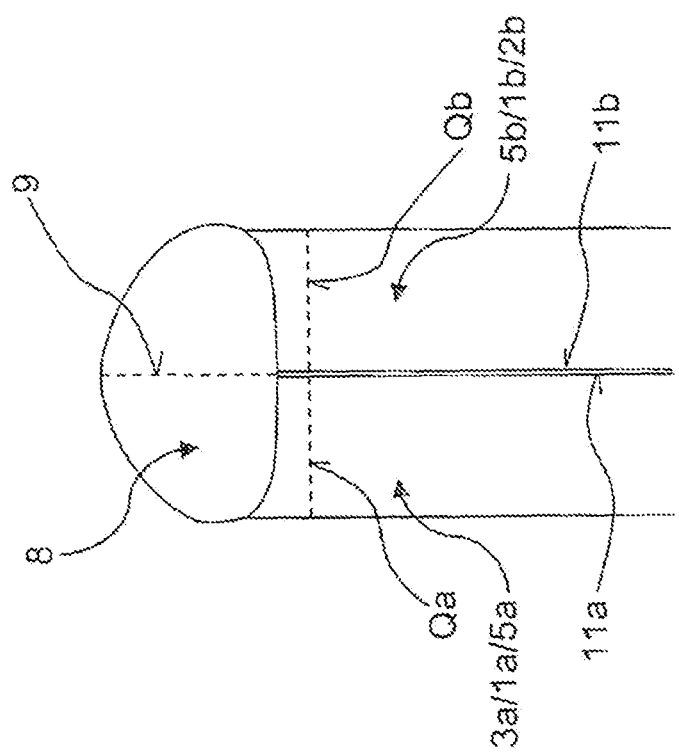
FIG. 2 shows a schematic side view of the end regions of two bar-type conductors welded according to the invention and interconnected by way of a weld bead, with the attachment area being marked.

FIG. 2 shows the end regions $5a$, $5b$ of the bar-type conductors $1a$, $1b$ following the laser welding. The bar-type conductors $1a$, $1b$ are electrically conductively interconnected by way of the weld bead 8. In this case, the weld bead 8 generally is seated over the entire area of both bar-type conductors $1a$, $1b$, that is to say covers their complete respective cross-sectional area Qa, Qb in each case (see also FIG. 11a below for more details in this respect).

The quality of the electrically conductive connection between the two bar-type conductors $1a$, $1b$ is substantially determined by what is known as the attachment area 9. This is the cross-sectional area made available by the weld bead 8 for conducting electrical current from the first bar-type conductor $1a$ to the second bar-type conductor $1b$ and approximately corresponds to the section of the weld bead 8 in the contact plane of the adjacent long sides 11a, 11b of the legs 3a, 2b of the bar-type conductors 1a, 1b.

In general, the attachment area 9 increases, the larger the weld bead 8 is. The size of the weld bead 8 (be it its height H, or else its volume) is very difficult to determine on account of frequent irregularities at the end regions 5a, 5b of the bar-type conductors 1a, 1b (for instance irregular or oblique shortening already before the start of the welding process), and, in particular, it is the experience of the inventors that it is hardly possible to reliably determine the size of the weld bead 8 by way of direct image evaluation.

Therefore, the present invention provides for an indirect determination of the size of the weld bead 8 by virtue of tracking the cooling down profile of the weld bead 8 following the deactivation of the processing laser beam. When the processing laser beam is deactivated, the entire weld bead 8 is typically approximately at the melting temperature $T_S$ of the material of the bar-type conductors 1a, 1b (attention is drawn to the fact that the processing laser beam evaporates material of the bar-type conductors 1a, 1b to a certain extent). The heat dissipation from the weld bead 8 is subsequently implemented practically exclusively by way of the two bar-type conductors 1a, 1b and therefore restricted by the thermal conductivity of the material of the bar-type conductors and the available cross-sectional areas Qa, Qb thereof ("one-dimensional heat dissipation"). The larger the weld bead 8, the more thermal energy must be dissipated via the bar-type conductors 1a, 1b. In the case of restricted heat dissipation, this leads to the temperature of a large weld bead 8 dropping more slowly over time than the temperature of a smaller weld bead 8.

The invention therefore provides for the measurement of a measurement variable depending on the temperature of the weld bead 8 (or a portion of the weld bead 8) as a function of time, and the determination of a parameter depending on the (absolute) heat capacity of the weld bead from this measurement variable. The (absolute) heat capacity of the weld bead 8 is proportional to its mass, and hence proportional to its volume or size. Accordingly, the attachment area can subsequently be determined qualitatively or quantitatively from the parameter.

It is relatively easy to measure a temperature-dependent measurement variable, in particular also by optical means. By way of example, measuring the intensity of the thermionic emission of the weld bead using a camera or a photodiode is particularly easily possible; likewise, the temperature of at least a portion of the weld bead can serve as the measurement variable. A parameter depending on the heat capacity of the weld bead 8 that is particularly easy to determine is the time duration between the deactivation of the processing laser beam and the (complete) solidification of the weld bead ("solidification time"); likewise, a temperature gradient can be used as parameter.

Figure 3:
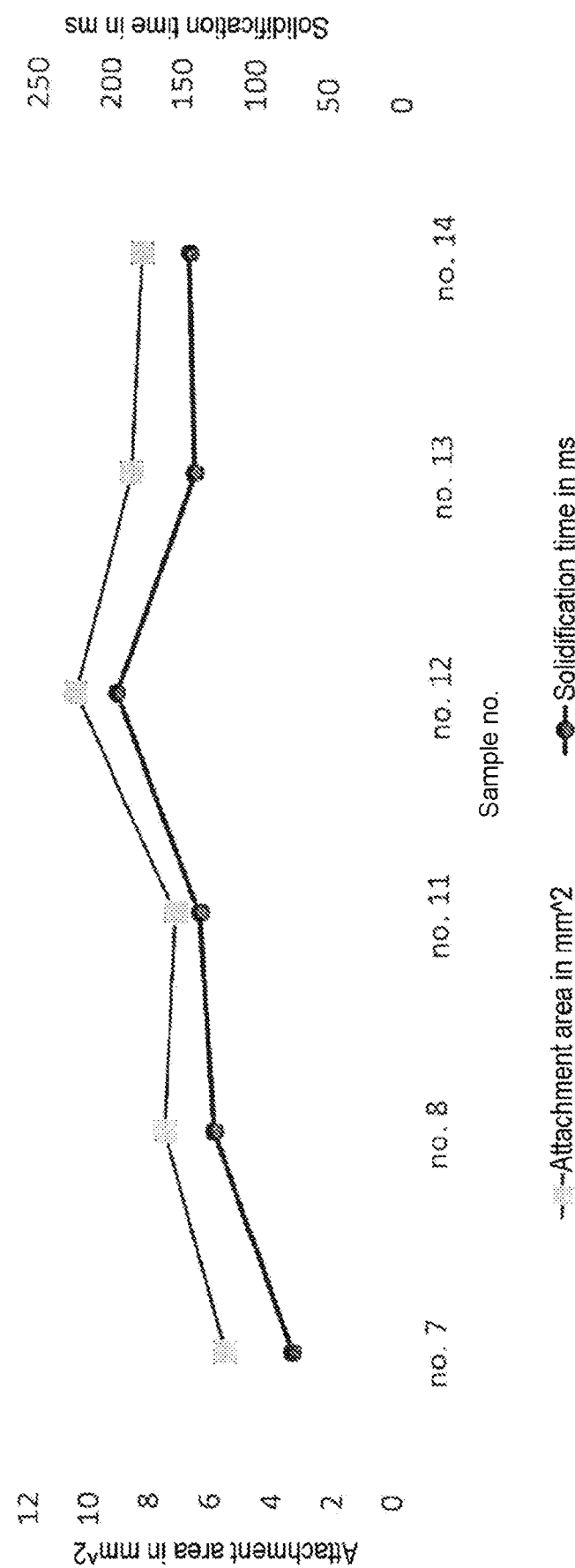
FIG. 3 shows a diagram representing the attachment area determined by x-ray and the measured solidification time for six exemplary welded measurement samples.

In a diagram for different experimental measurement samples, in which end regions of bar-type conductor dummies were welded for the invention using a processing laser beam corresponding to the geometry shown in FIG. 1b and FIG. 2, FIG. 3 in each case illustrates a solidification time determined by way of optical observations (cf., circular markings) and an actual attachment area determined by way of conventional x-ray analysis (cf., square markings). It is quite evident that the attachment area correlates significantly with the solidification area. Accordingly, the attachment area can be inferred from the solidification time and can be determined qualitatively and quantitatively.

It is evident from the diagram of FIG. 3 that an attachment area of approximately 8 mm² is obtained after a solidification time of approximately 140 ms. By way of example, if an attachment area of at least 8 mm² should be ensured in this situation within the scope of monitoring the attachment area of the bar-type conductor welds, an insufficient attachment area of less than 8 mm² can be inferred from a solidification time of less than 140 ms ("decision value"), while a sufficient attachment area of 8 mm² or more can be inferred for a solidification time of more than 140 ms. This would be a typical qualitative determination of the attachment area. Welds with attachment areas recognized as being too small are typically fed to subsequent welding.

If desired, a simple, linear functional relationship between solidification time and attachment area, for example, can also be obtained from the diagram. To a good approximation, the following applies in this case for the solidification time EZ and the attachment area AF:

$$AF(EZ)=0.0419 \text{ mm}^2/ms*EZ+2.426 \text{ mm}^2$$

A quantitative statement about the attachment area can also easily be made from the solidification time as parameter by way of such a functional relationship.

The qualitative or quantitative determination of the attachment area from the parameter requires calibration measurements, as shown in FIG. 3, for a respective welding situation (in particular, size, arrangement and material of the bar-type conductors).

If desired, welding parameters (such as the laser power or the duration of the processing laser beam exposure) can also be optimized or adjusted for a certain attachment area on the basis of a quantitative determination of the attachment area.

Figure 4:
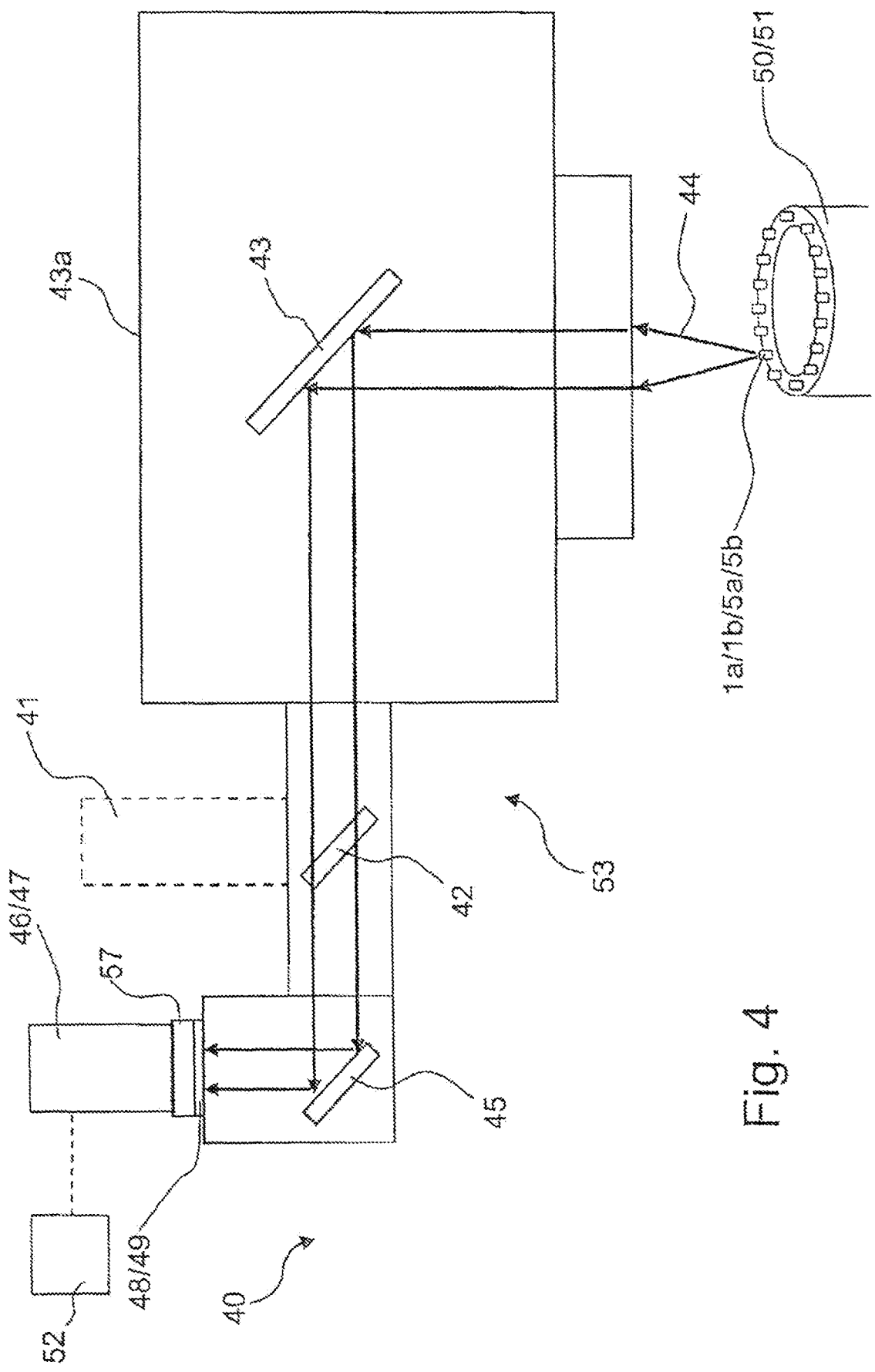
FIG. 4 shows a schematic representation of a first embodiment of an apparatus according to the invention for laser welding, with a measurement by means of a camera of the intensity of the thermionic emission on a portion of the weld bead.

In a schematic representation, FIG. 4 shows the structure of a first apparatus 40 according to the invention for laser welding, by means of which the method according to the invention can be carried out.

The apparatus 40 comprises a processing laser 41, by means of which a processing laser beam (not depicted in any more detail, but cf. FIG. 1b in this respect) with a wavelength of 1030 nm in this case can be directed at the end regions 5a, 5b of a pair of bar-type conductors 1a, 1b via a semitransparent mirror 42 and via a scanner mirror 43 of a programmable focusing optical unit 43a. The bar-type conductors 1a, 1b are arranged in a holding device 50 which is embodied here as a stator mount 51 for an electric motor; the holding device 50 typically holds more than thirty pairs of bar-type conductors at the same time.

Following the deactivation of the processing laser beam, the weld bead that arose (not depicted in any more detail, but cf. FIG. 2 in this respect) exhibits thermionic emission 44. Via the scanner mirror 43, the semitransparent mirror 42 and the mirror 45 as well as the collimation lens 57, the thermionic emission 44 is imaged into a sensor device 46, which is a camera 47 in this case; alternatively, a photodiode could also be used as a sensor device 46 (not depicted in any more detail, but cf. FIG. 9). An optical filter 48 is arranged in front of the camera 47; in this case, this is a bandpass filter 49 which only passes the spectral range from 800 nm to 1000 nm. The camera 47 is connected to an electronic evaluation device 52. According to the beam path depicted here, the camera 47 is directed from above at the end regions 5a, 5b of the bar-type conductors 1a, 1b or the weld bead there.

The programmable focusing optical unit 43a as well as the mirrors 42, 45 and the camera 47 are in this case combined to form a laser processing head 53; however, attention is drawn to the fact that the camera may also be arranged independently of the laser processing head, in particular in order to be directed at the weld bead from the side.

Figure 5A:
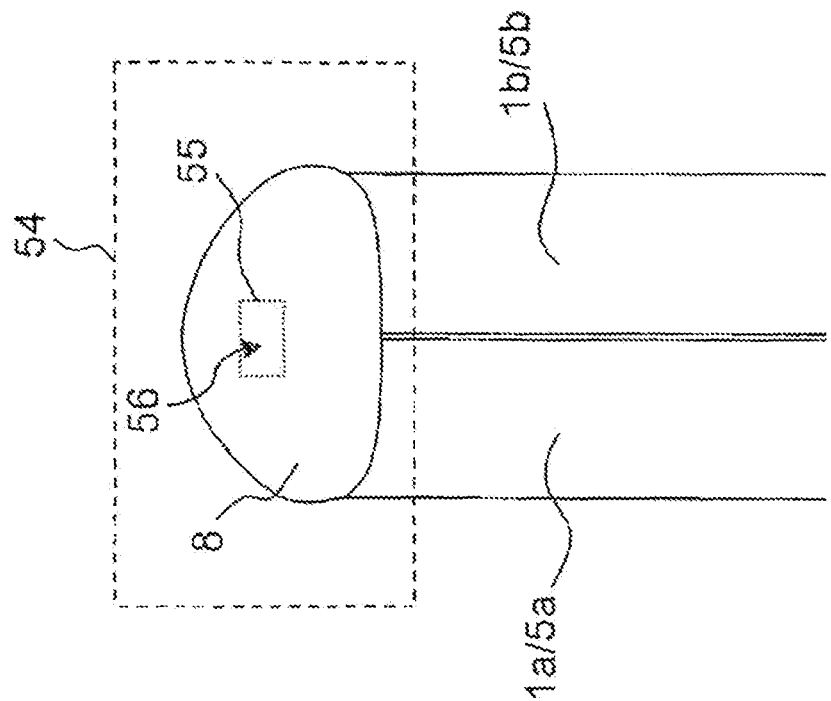
FIG. 5a shows a schematic side view of the end regions of two bar-type conductors welded according to the invention and interconnected by means of a weld bead, with the image recorded by the camera of the apparatus of FIG. 4 and the partial region of this image corresponding to a central, upper portion of the weld bead, which partial region was selected for the determination of the thermionic emission, being marked.

In this case, an image 54 of the weld bead 8 is taken from above using the camera 47, as indicated schematically in FIG. 5a. A mean grayscale value (mean brightness) is determined as a measurement variable from a partial region 55 of the image 54; this grayscale value corresponds to the intensity of the thermionic emission of the weld bead 8 in a portion 56 of the weld bead 8 that corresponds to the partial region 55, with this portion 56 being located centrally at the top of the weld bead 8 in this case. The portion 56 is therefore located opposite the former partial areas (end surfaces), on which the processing laser beam had previously been incident (cf. FIG. 1b in this respect).

Figure 5B:
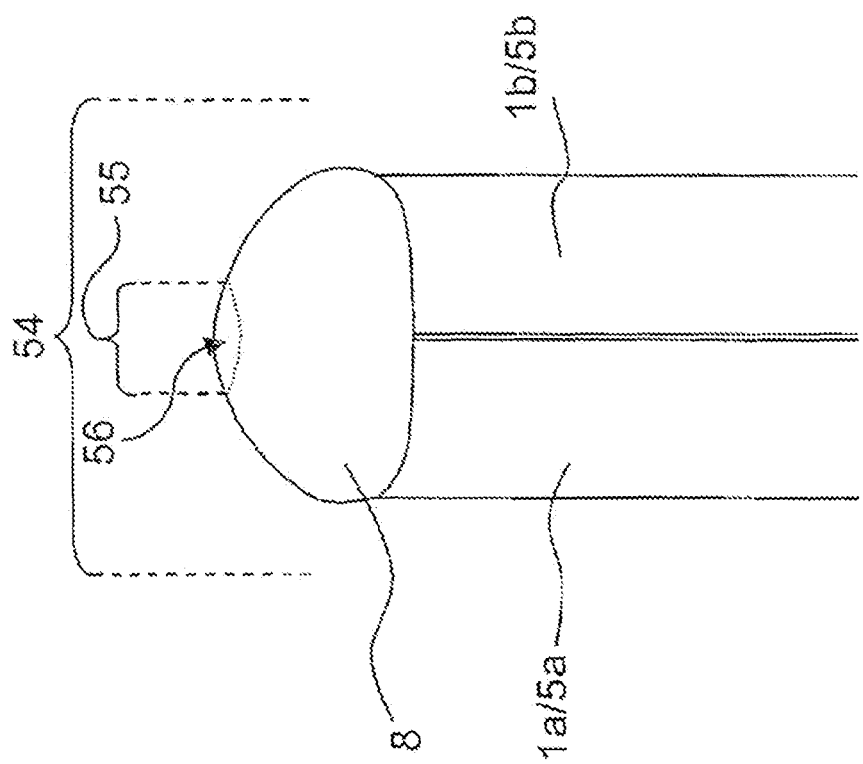
FIG. 5b shows a schematic side view of the end regions of two bar-type conductors welded according to the invention and interconnected by means of a weld bead, with the image recorded by an alternatively arranged camera and the partial region of this image corresponding to a portion of the weld bead located to the side of the weld bead, which partial region was selected for the determination of the thermionic emission, being marked.

Alternatively, the camera may also be directed at the weld bead 8 laterally, as depicted in FIG. 5b. The partial region 55 of the corresponding image 54 is then typically chosen at a distance from the edge of the weld bead 8 and approximately at the center of the weld bead 55.

Figure 6:
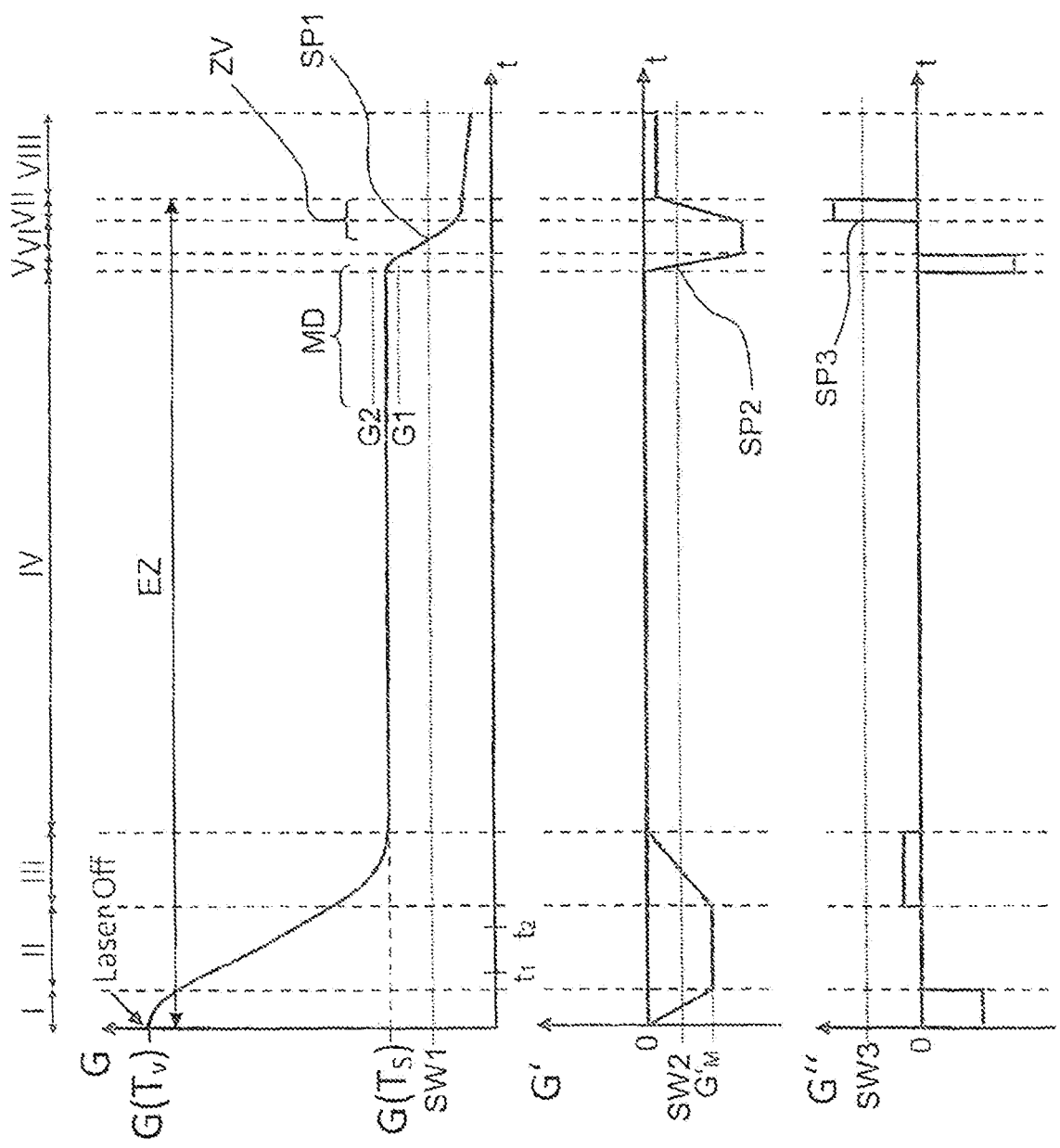
FIG. 6 shows a schematic diagram representing a mean grayscale value corresponding to the intensity of the thermionic emission observed on a portion of the weld bead during its cooling down as a function of time (top), and the first derivative of the grayscale value with respect to time (middle) and the second derivative of the grayscale value with respect to time (below), for the invention.

FIG. 6, top, shows a schematic diagram of a typical profile of the mean grayscale value G as a function of time t while the weld bead cools down, as observed using the apparatus of FIG. 4. The grayscale value G corresponds to the intensity of the thermionic emission of the weld bead. The mean grayscale value measurement is implemented from the deactivation of the processing laser until the liquid-solid phase transition of the weld bead.

A grayscale value $G(T_V)$ which corresponds to the evaporation temperature $T_V$ of the material of the bar-type conductors is measured immediately upon deactivation of the processing laser beam. Following the deactivation of the processing laser (labeled "Laser off"), the grayscale value G drops during time intervals I, II, III in accordance with the temperature drop of the still entirely liquid weld bead, and then remains at a virtually constant value $G(T_S)$ corresponding to the melting temperature $T_S$ of the material of the bar-type conductors during a phase of recrystallization (solidification) of the weld bead, which proceeds from bottom to top, in interval IV. In interval IV, the grayscale value G is determined on a portion of the weld bead that continues to be liquid. The last, still liquid upper portion of the weld bead observed here solidifies in intervals V, VI and VII, with the grayscale value dropping significantly since the thermionic emission is significantly reduced following the liquid-solid phase transition. During interval VI, the solidification front migrates through the evaluated partial region of the image of the camera, with in this case G having its steepest and approximately linear profile. Then, in a subsequent interval VIII, the grayscale value G continues to fall, albeit significantly more slowly in accordance with the gradual further reduction in the temperature of the fully solidified weld bead.

By way of the point of intersection SP1 of the curve of the grayscale value G(t) with the line of a first threshold value SW1, which preferably corresponds to a grayscale value from the (expected) value range of interval VI, it is possible to easily determine the actual solidification time EZ (corresponding to the time duration from the start of interval I to the end of the interval VII) to a good approximation, for instance using the electronic evaluation unit (attention is drawn to the fact that the flat profile in the region of intervals VII and VIII would lead to the determination of a point of intersection there having significantly larger errors). Attention is furthermore drawn to the fact that intervals V, VI and VII are typically short in comparison with intervals I, II, III and IV. If desired, a known (expected) time offset ZV between the point of intersection SP1 and the end of the solidification can be added to the time of the determined point of intersection SP1, in order to approximate the actual solidification time EZ even better.

For another way of determining the solidification time EZ, it is possible to resort to the first derivative G' of the grayscale value G with respect to time, cf. the middle diagram of FIG. 6; the derivative can be calculated numerically. The drop in the thermionic emission while the weld bead solidifies in intervals V, VI and VII can be identified even better in the first derivative G' than in the curve of G; the solidification in interval V can easily be identified as a result of G' becoming negative. However, since similar (negative) values of G' also occur at the start of the cooling, for instance in interval I, the solidification time EZ is determined approximately by a point of intersection SP2 of the curve of G' with the line of a second threshold value SW2 just below "zero", in respect of which the curve of G had previously only varied within specified limits G1, G2 over a minimum duration MD. The latter criterion is only satisfied before the point of intersection SP2 in interval IV (where G' is approximately "zero") and at the start of interval V (and for instance not in intervals I, II and VII), and so the second point of intersection SP2 is uniquely determinable as a result. Attention is once again drawn to the fact that the intervals V, VI and VII are short in comparison with intervals I, II, III and IV; if desired, it is once again possible to add a known (expected) time offset between the point of intersection SP2 and the end of the solidification to the time of the point of intersection SP1 in order to determine the solidification time EZ even more accurately (see above).

A slightly more accurate determination of the solidification time EZ is also possible on the basis of the second derivative G" of the grayscale value G with respect to time, cf. the lower diagram in FIG. 6; the second time derivative can also be calculated numerically, for instance in the electronic evaluation unit. In this case, complete solidification is determined quite accurately by a point of intersection SP3 of the curve of G" with the line of a third threshold value SW3, which is chosen clearly above "zero" to be so large that this threshold value SW3 is reached for the first time in interval VII (and not already in interval III, for instance). If necessary, there can also be assurance here by way of a previously elapsed minimum duration, within which the grayscale value G only varied within specified limits, and it is once again possible to add a known (expected) time offset between the determined point of intersection SP3 and the actual end of the solidification in order to determine EZ more accurately (not depicted in more detail in each case, but see above).

The mean gradient $G'_M$ of the grayscale value G (with respect to time) in a specified time period between two times t1 and t2 preferably chosen in the interval II is also well suited to being a parameter depending on the absolute heat capacity (in addition to the solidification time EZ). In this interval II, the absolute value of G' is relatively large and approximately constant, and can therefore be determined well.

Attention is drawn to the fact that the curves for G, G' and G" are depicted in idealized fashion here and, in practice, generally vary in time around the profile depicted here; however, good curve smoothing can be achieved by way of a sufficiently large integration area (partial area of the image observed by the camera).

Figure 7:
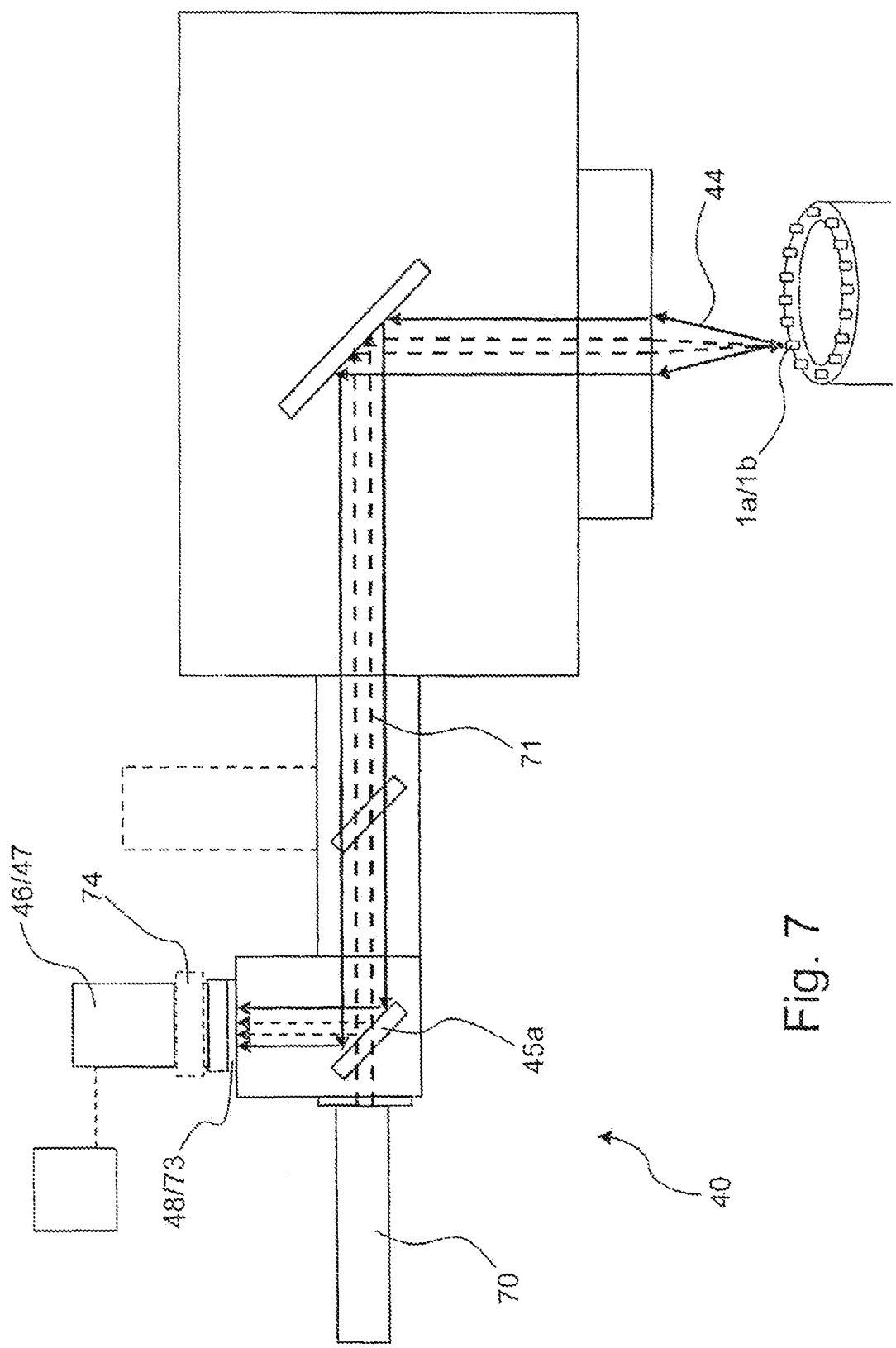
FIG. 7 shows a schematic representation of a second embodiment of an apparatus according to the invention for laser welding, with a measurement by means of a camera of the intensity of an observation laser beam reflected at the weld bead.

In a schematic representation, FIG. 7 shows the structure of a second apparatus 40 according to the invention for laser welding, by means of which the method according to the invention can be carried out. Only the significant differences in relation to the apparatus of FIG. 4 will be explained.

While the weld bead on the bar-type conductors 1a, 1b cools in the apparatus 40 of FIG. 7, the weld bead is illuminated through a semitransparent mirror 45a by means of an observation light beam 71, in this case an observation laser beam, with a (mean) wavelength of 810 nm in this case, from an observation light source 70, an observation laser in this case. The observation light source 70 does not introduce noticeable amounts of energy into the bar-type conductors 1a, 1b but the observation laser beam 71 is reflected at the weld bead dependent on the temperature of the weld bead. The intensity of the observation light beam 71 reflected at the weld bead is registered in the camera 47, together with the thermionic emission 44 of the weld bead.

A narrow bandwidth bandpass filter 73 as an optical filter 48, which only passes wavelengths in the range of 800 nm to 820 nm in this case, is arranged in front of the camera 47 in order to minimize the proportion of the thermionic emission 44 in the measured intensity or the measured grayscale value at the camera 47.

Optionally, a polarization filter 74 can additionally be provided in front of the camera 47 and can be used to improve the contrast in the image recorded by the camera 47.

Figure 8:
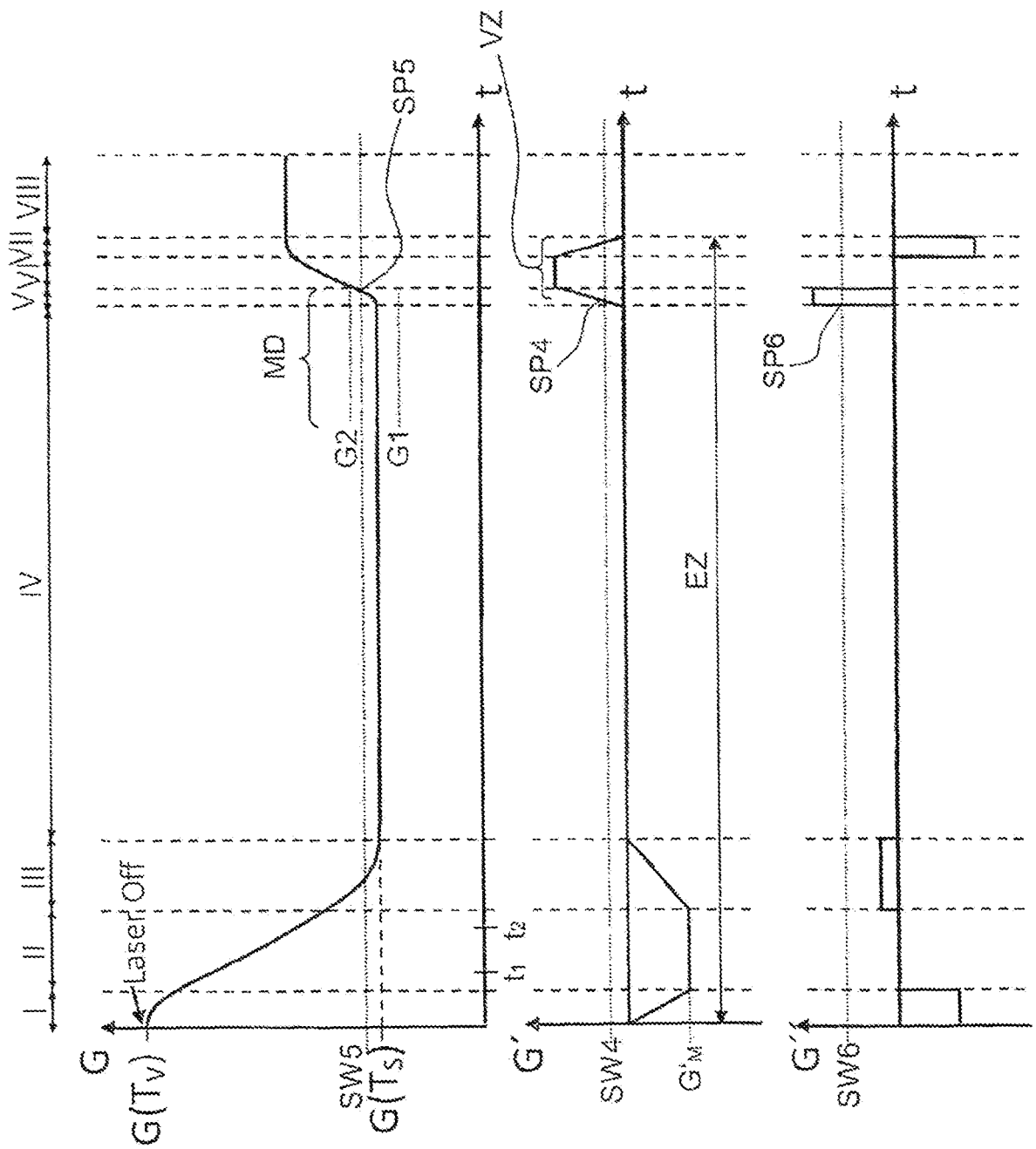
FIG. 8 shows a schematic diagram representing a mean grayscale value corresponding to the superposition of the intensity of the thermionic emission and the intensity of the reflected observation laser beam observed by means of the apparatus of FIG. 7 on a portion of the weld bead during its cooling down as a function of time (top), and the first derivative of the grayscale value with respect to time (middle) and the second derivative of the grayscale value with respect to time (below), for the invention.

FIG. 8, top, shows a schematic diagram of a typical profile of the mean grayscale value G as a function of time t while the weld bead cools down, as observed using the apparatus of FIG. 7. The grayscale value G corresponds to the superposition of the intensity of the thermionic emission of the weld bead and the intensity of the reflected observation laser beam. Only the significant differences in relation to FIG. 6 will be explained.

In the first intervals I, II and III, the thermionic emission dominates the intensity measured at the camera, which therefore largely corresponds to the profile in FIG. 6: The grayscale value G reduces in accordance with the thermionic emission of the liquid weld bead that decreases with the temperature. The grayscale value G once again remains constant in interval IV.

However, starting with interval IV, it is the intensity of the observation laser beam reflected at the weld bead that dominates the grayscale value. With the liquid-solid phase transition starting in interval V, the reflectivity of the weld bead increases significantly (or the absorption reduces significantly), and the grayscale value G increases accordingly. In interval VIII, following the complete solidification of the weld bead, the intensity of the reflected laser light remains approximately constant.

This can be determined best by way of the first derivative G' of the grayscale value G with respect to time, cf. the middle diagram in FIG. 8. Where the curve of G' intersects the line of a threshold value SW4 chosen slightly above zero for the first time, the point of intersection SP4 corresponds to the solidification time EZ to good approximation; if desired, a known (expected) time offset ZV between the time of the point of intersection SP4 and the end of the solidification (at the end of interval VII) can be added to the determined time of the point of intersection SP4 in order to determine EZ even more accurately.

Alternatively, reaching the threshold value SW5 (at the point of intersection SP5) for the grayscale value G or reaching the threshold value SW6 (at the point of intersection SP6) for the second derivative G" of the grayscale value G (cf. lower diagram) can also be provided for the determination of the solidification time EZ, but these should be assured by way of a preceding minimum duration MD, during which the grayscale value G only varies within specified limits G1, G2 (plotted in exemplary fashion at G in the upper diagram in order to assure the point of intersection SP5).

Figure 9:
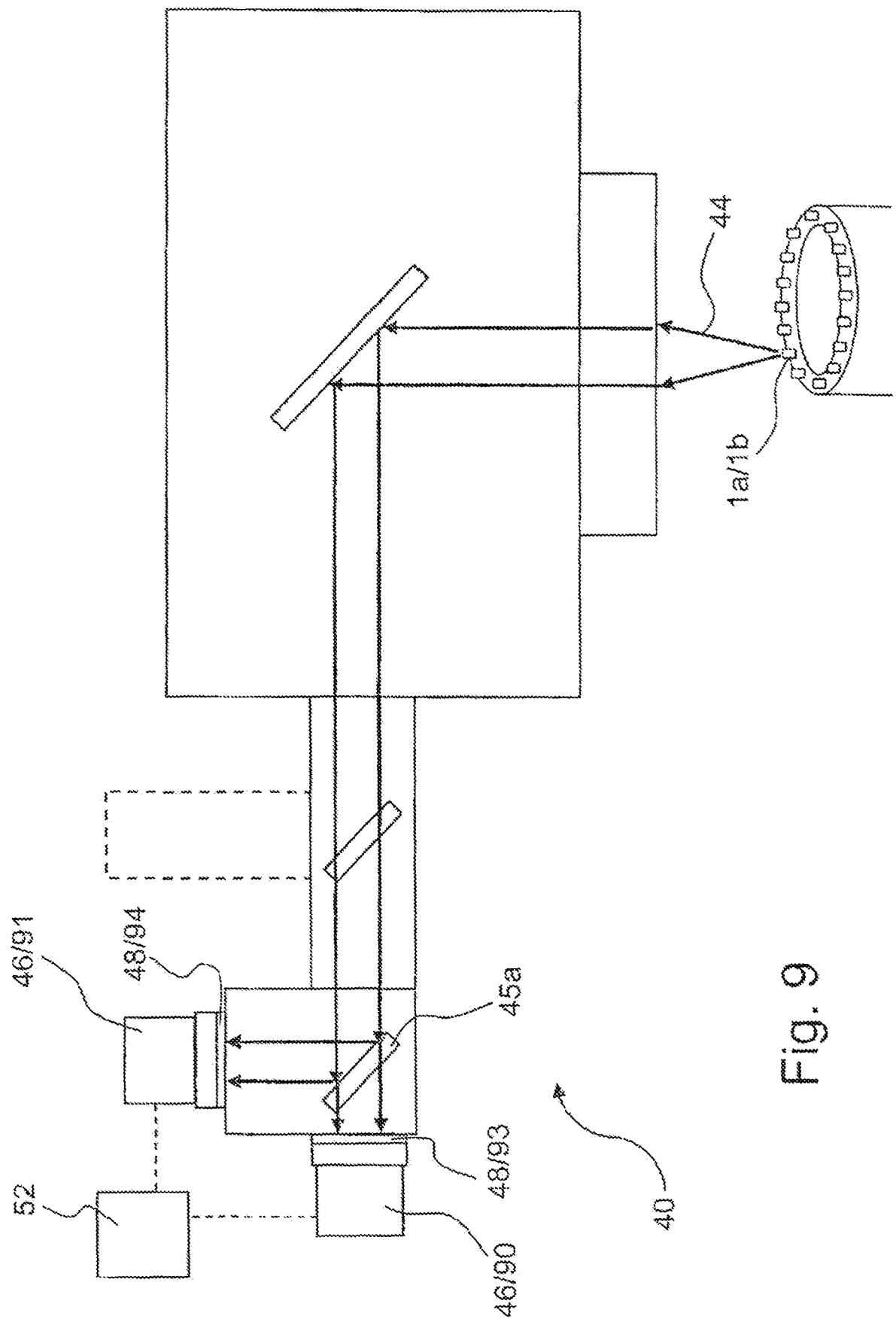
FIG. 9 shows a schematic representation of a third embodiment of an apparatus according to the invention for laser welding, with a measurement by means of quotient pyrometry of the temperature of the weld bead.

In a schematic representation, FIG. 9 shows the structure of a third apparatus 40 according to the invention for laser welding, by means of which the method according to the invention can be carried out. Once again, only the significant differences in relation to the apparatus of FIG. 4 will be explained.

The apparatus 40 is set up for quotient pyrometry and accordingly comprises two sensor devices 46, in this case formed as two photodiodes 90, 91, which are illuminated by the thermionic emission 44 of the weld bead at the bar-type conductors 1a, 1b. Both photodiodes 90, 91 are connected to the electronic evaluation device 52.

An optical filter 48 in the form of a narrow bandwidth bandpass filter 93 that only passes light of a first central wavelength $\lambda 1$, including a small surrounding wavelength interval of typically +/−30 nm or less, preferably +/−20 nm, is arranged in front of the photodiode 90. An optical filter 48 likewise in the form of a narrow bandwidth bandpass filter 94 that only passes light of a second central wavelength $\lambda 2$, including a small surrounding wavelength interval of typically +/−30 nm or less, preferably +/−20 nm, is arranged in front of the photodiode 91. By way of example, $\lambda 1$ is at 1550 nm and $\lambda 2$ is at 1620 nm. The temperature of the weld bead (or of the observed portion thereof) as a measurement variable can be determined from the ratio of the intensities at the two wavelengths $\lambda 1$ and $\lambda 2$.

Figure 10:
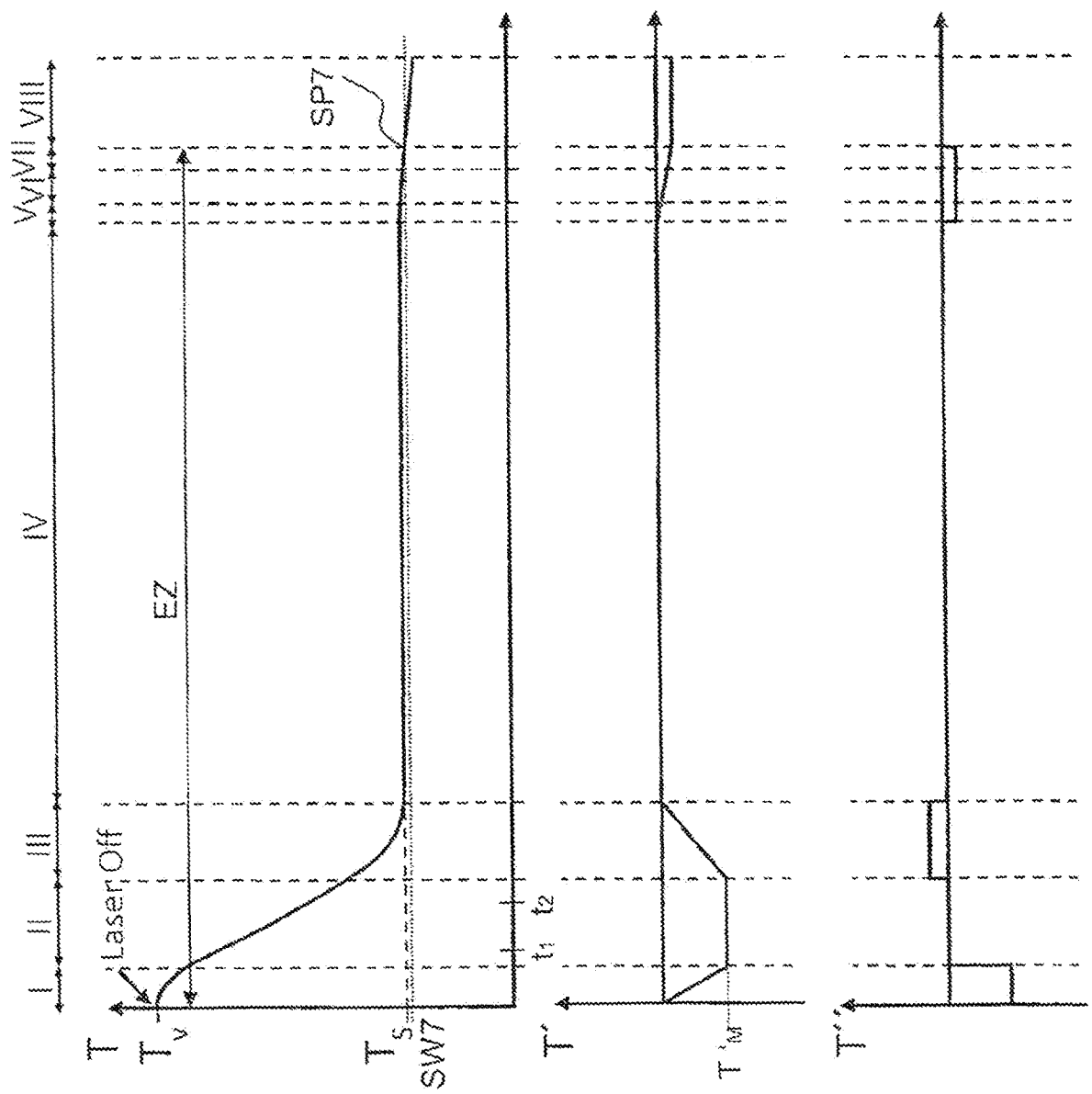
FIG. 10 shows a schematic diagram representing the temperature observed in the apparatus of FIG. 9 on a portion of the weld bead during its cooling down as a function of time (top), and the first derivative of the temperature with respect to time (middle) and the second derivative of the temperature with respect to time (below), for the invention.

FIG. 10, top, shows a schematic diagram of a typical profile of the temperature T as a function of time t while the weld bead cools down, as observed using the apparatus of FIG. 9; in this case, the temperature is observed in a central, upper portion of the weld bead. The profile of the temperature T is largely analogous to that of the grayscale value of the thermionic emission as explained in FIG. 6, in particular having a significant temperature drop at the beginning in intervals I, II and III, and having a temperature T that is constant and corresponds to the melting temperature $T_S$ over a relatively long period of time in interval IV such that an evaluation of the temperature T can in this respect be implemented in a manner analogous to the evaluation of the grayscale value of the thermionic emission (q.v.), which is why it is possible to refrain from repetition here. However, attention is drawn to the fact that the (mean) temperature (in the observed partial region) remains virtually constant and changes only very little during the solidification of the last portion of the weld bead, which remains liquid for the longest period of time, in intervals V, VI and VII, the portion being the upper portion of the weld bead observed in this case; the temperature only starts to drop slowly again, with an approximately constant gradient T', with a complete solidification of the weld bead at the end of interval VII. Preferably, a threshold value SW7 just below the melting temperature $T_S$ (for instance, at the start of the expected interval VIII) is applied to the temperature T in this case, in order to determine the solidification time EZ as a parameter to a very good approximation by way of the time of the point of intersection SP7. It is likewise quite possible to determine the mean temperature gradient $T'_M$ between times t1 and t2 in interval II as a parameter.

Figure 11B:
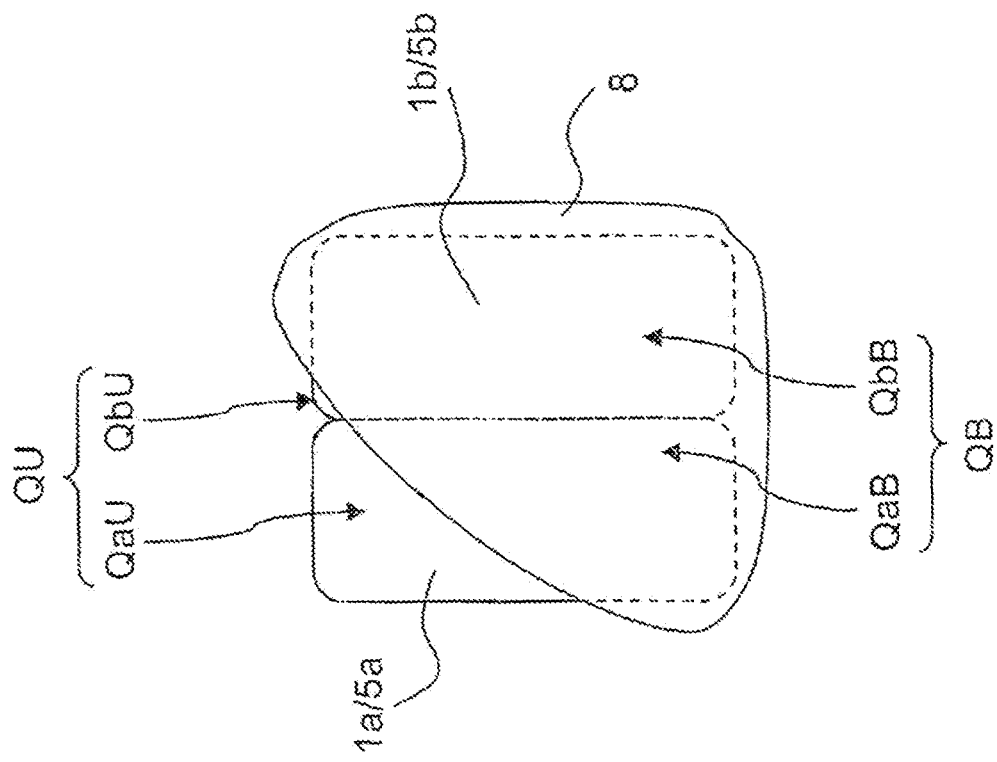
FIG. 11b shows a schematic plan view of the weld bead at the end on the end regions of two welded bar-type conductors, with the cross sections of the end regions of the bar-type conductors being only partially covered by the weld bead, for the invention.
Figure 11A:
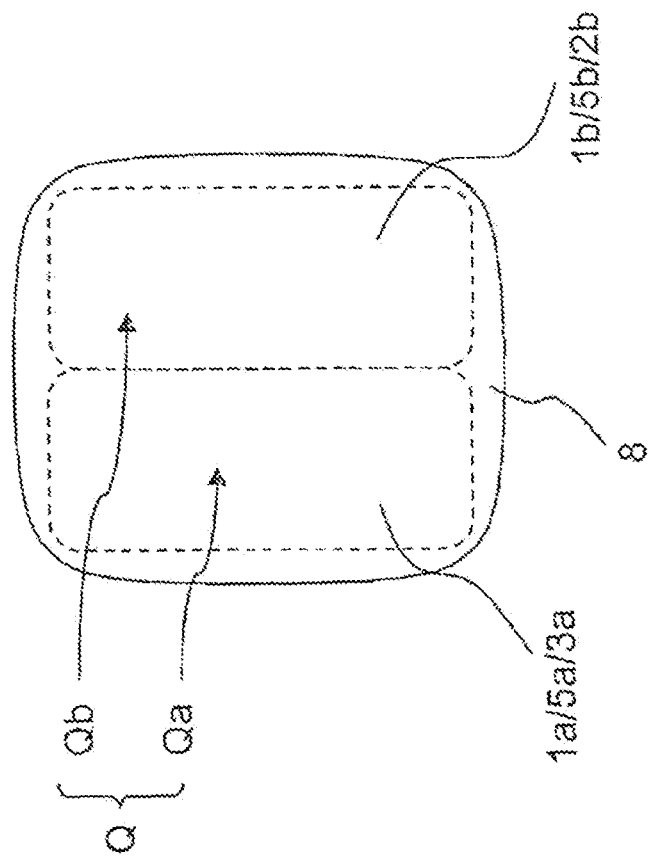
FIG. 11a shows a schematic plan view of the weld bead at the end on the end regions of two welded bar-type conductors, with the cross sections of the end regions of the bar-type conductors being fully covered by the weld bead, for the invention.

During the laser welding of the end regions 5a, 5b of the bar-type conductors 1a, 1b, the cross sections Qa, Qb of the bar-type conductors 1a, 1b (perpendicular to the direction of the extent of the legs 3a, 2b) are generally completely covered by the weld bead 8, as illustrated schematically in the plan view of FIG. 11a.

However, what very occasionally occurs as a consequence of the formation of spatter, for example, is that the weld bead 8 does not fully cover the cross section of one of the bar-type conductors 1a, 1b or else of both bar-type conductors 1a, 1b, as depicted in FIG. 11b. In the example shown, approximately ⅓ of the cross section Qa of the bar-type conductor 1a is an uncovered proportion QaU and approximately ⅔ of the cross section Qa is a proportion QaB that is covered by the weld bead 8. For the bar-type conductor 1b, approximately ¹⁄₅₀ of the cross section Qb is an uncovered proportion QbU, and approximately ⁴⁹⁄₅₀ of the cross section Qb is a proportion QbB that is covered by the weld bead 8, and this is hardly of any consequence. Overall, approximately ⅙ of the entire cross section Q=Qa+Qb of the bar-type conductors 1a, 1b is uncovered in this case, corresponding to an uncovered proportion QU of the entire cross section Q of approximately ⅙.

Within the scope of the invention, provision can be made for the attachment area to also be classified as insufficient if the uncovered proportion QU of Q exceeds a limit value GW, independently of the observation of the measurement variable and the parameter determined therefrom. Preferably, the limit value GW is determined as 0.10 or less, preferably 0.05 or less, in relation to the full cross section Q. As a result, a poor electrical connection between the bar-type conductors 1a, 1b can be recognized and optionally remedied by subsequent welding.

Too small proportions QB of the entire cross section Q of the bar-type conductors 1a, 1b covered by the weld bead are also treacherous because they lead to a reduced quality heat dissipation from the weld bead 8. The slowed-down cooling of the weld bead 8 feigns a larger weld bead 8 and, accordingly, a sufficiently large attachment area during the observation according to the invention of the temperature-dependent measurement variable and the parameter determined therefrom, even though the attachment area is in fact too small. This problem can be remedied by the additional determination of the uncovered proportion QU, which is easily possible by way of an optical evaluation of a plan view of the weld bead. Attention is drawn to the fact that QU+QB=1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1a, 1b Bar-type conductor
2a, 2b (Left) leg
3a, 3b (Right) leg
4a, 4b Central part
5a, 5b End region
6a, 6b End surface
7 Processing laser beam
8 Weld bead
9 Attachment area
11a, 11b Long side
12 Circular trajectory
40 Apparatus
41 Processing laser
42 Semitransparent mirror
43 Scanner mirror
43a Programmable focusing optical unit
44 Thermionic emission
45 Mirror
45a Semitransparent mirror
46 Sensor device
47 Camera
48 Optical filter
49 Bandpass filter
50 Holding device
51 Stator mount
52 Electronic evaluation device
53 Laser processing head
54 Image
55 Partial region of the image
56 Portion of the weld bead
57 Collimation lens
70 Observation light source
71 Observation light beam
73 Bandpass filter
74 Polarization filter
90 Photodiode
91 Photodiode
93 Bandpass filter
94 Bandpass filter
EZ Solidification time
G Grayscale value
G' First derivative of the grayscale value with respect to time
$G'_M$ Mean gradient of the grayscale value
G" Second derivative of the grayscale value with respect to time
G1, G2 Limit (for the measurement variable)
GW Limit value (for the uncovered proportion)
H Height of the weld bead
MD Minimum duration
Q Cross section of both bar-type conductors
Qa Cross section of bar-type conductor 1a
Qb Cross section of bar-type conductor 1b
QaB Covered proportion of the cross section of bar-type conductor 1a
QbB Covered proportion of the cross section of bar-type conductor 1b QaU Uncovered proportion of the cross section of bar-type conductor 1a
QbU Uncovered proportion of the cross section of bar-type conductor 1b
QU Uncovered proportion of the cross section of both bar-type conductors
SP1-SP7 Points of intersection
SW1-SW7 Threshold values
t Time
$t_1$, $t_2$ Times
T Temperature
T' First derivative of the temperature with respect to time
$T'_M$ Mean gradient of the temperature
T" Second derivative of the temperature with respect to time
$T_S$ Melting temperature
$T_V$ Evaporation temperature
ZV Time offset

The invention claimed is:

1. A method for monitoring an attachment area during laser welding of bent bar-type conductors containing copper, the method comprising:
arranging a first bar-type conductor relative to a second bar-type conductor in partially overlapping fashion;
welding the first and second bar-type conductors to one another using a processing laser beam, the welding including forming a weld bead interconnecting the first and second bar-type conductors to one another;
after the welding, measuring on at least one portion of the weld bead at least one measurement variable that changes with a temperature of the weld bead as a function of the time during a cooling down of the weld bead, wherein the at least one measurement variable comprises an intensity of a thermionic emission from a portion of the weld bead, and wherein the weld bead is observed using a camera or a photodiode, and the intensity of the thermionic emission is determined by a mean grayscale value from a partial region of an image recorded by the camera or a grayscale value recorded by the photodiode;
determining a parameter depending on a heat capacity of the weld bead from the at least one measured measurement variable; and
determining the attachment area qualitatively or quantitatively from the parameter.

2. The method as claimed in claim 1, wherein
the arranging of the first and second bar-type conductors is performed such that end regions of the first and second bar-type conductors are respectively parallel to one another and next to one another,
end surfaces of the first and second bar-type conductors are located approximately level in relation to a direction of a longitudinal extent of the end regions, and
the processing laser beam is directed at the two bar-type conductors in such a way that the weld bead is formed at the end surfaces of the bar-type conductors.

3. The method as claimed in claim 1, wherein the measuring of the at least one measurement variable includes observing the portion of the weld bead in a visible spectral range or in an infrared spectral range.

4. The method as claimed in claim 3, wherein the measuring of the at least one measurement variable is performed on the portion of the weld bead opposite to a second portion of the first and second bar-type conductors on which the processing laser beam acted.

5. The method as claimed in claim 1, wherein the intensity of the thermionic emission is measured in a restricted spectral range.

6. The method as claimed in claim 1, further comprising illuminating the weld bead using an observation light beam while the weld bead cools down,
wherein the at least one measurement variable comprises an intensity of the observation light beam reflected at a surface of the weld bead.

7. The method as claimed in claim 6, wherein the intensity of the reflected observation light beam is measured in a restricted spectral range about a central wavelength of the observation light beam.

8. The method as claimed in claim 6, further comprising disposing a polarization filter in front of a sensor device used to measure the intensity of the reflected observation light beam.

9. The method as claimed in claim 1, wherein the at least one measurement variable comprises the temperature on the portion of the weld bead.

10. The method as claimed in claim 9, wherein the temperature is measured using quotient pyrometry, with the intensity of the thermionic emission from the portion of the weld bead being measured at two different wavelengths.

11. The method as claimed in claim 1, wherein the parameter is a time duration that elapses between a first defined state and a second defined state while the weld bead cools down.

12. The method as claimed in claim 11, wherein the first defined state is an end of processing laser beam exposure.

13. The method as claimed in claim 11, wherein the second defined state is a complete solidification of the weld bead.

14. The method as claimed in claim 11, wherein the first defined state or the second defined state is recognized by the at least one measurement variable reaching a threshold value.

15. The method as claimed in claim 11, wherein the first defined state or the second defined state is recognized by a first time derivative or a second time derivative of the at least one measurement variable reaching a threshold value.

16. The method as claimed in claim 1, wherein the parameter is a gradient of the at least one measurement variable with respect to time and is determined at a specified time or averaged over a specified time period.

17. The method as claimed in claim 1, further comprising comparing the parameter or the attachment area to a decision value,
upon determining that the decision value is not reached, recognizing that the attachment area of the weld bead as being too small, and
upon determining that the decision value is reached, recognizing the attachment area as being sufficiently large and permitting the first and second bar-type conductors to be used further.

18. The method as claimed in claim 17, further comprising determining a proportion of a cross section of the first and second bar-type conductors not covered by the weld bead using the camera, and recognizing the attachment area of the weld bead of the first and second bar-type conductors as being too small when the uncovered proportion of the cross section exceeds a limit value, even if the decision value is reached.

19. A method for monitoring an attachment area during laser welding of bent bar-type conductors containing copper, the method comprising:

arranging a first bar-type conductor relative to a second bar-type conductor in partially overlapping fashion;

welding the first and second bar-type conductors to one another using a processing laser beam, the welding including forming a weld bead interconnecting the first and second bar-type conductors to one another;

after the welding, measuring on at least one portion of the weld bead at least one measurement variable that changes with a temperature of the weld bead as a function of time during a cooling down of the weld bead;

determining a parameter depending on a heat capacity of the weld bead from the at least one measured measurement variable;

determining the attachment area qualitatively or quantitatively from the parameter; and welding a multiplicity of pairs of bar-type conductors in succession, with one or more welding parameters being optimized and/or updated in a control loop when the pairs of bar-type conductors are welded such that the parameter or an-the attachment area quantitatively determined from the parameter is set to a specified target value for the pairs of welded bar-type conductors.

20. An apparatus for laser welding bent bar-type conductors containing copper, the apparatus comprising:

a holding device configured to arrange two bar-type conductors in overlapping fashion, the holding device comprising a stator mount with a multiplicity of bar-type conductors to be welded;

a laser processing head configured to provide a processing laser beam configured to weld the two bar-type conductors to one another such that a weld bead interconnecting the two bar-type connectors is formed;

a sensor device configured to measure at least one measurement variable that changes with a temperature of the weld bead on a portion of the weld bead following an end of exposure to the processing laser beam and while the weld bead cools down, wherein the sensor device comprises a camera or a photodiode, and wherein the at least one measurement variable comprises an intensity of a thermionic emission from the portion of the weld bead determined by a mean grayscale value from a partial region of an image recorded by the camera or a grayscale value recorded by the photodiode;

an electronic evaluation device configured to:
    determine a parameter depending on a heat capacity of the weld bead from the at least one measurement variable, and
    qualitatively or quantitatively determine an attachment area set up by the weld bead from the parameter.

* * * * *